(12) United States Patent
Henzinger

(10) Patent No.: US 8,015,162 B2
(45) Date of Patent: Sep. 6, 2011

(54) DETECTING DUPLICATE AND NEAR-DUPLICATE FILES

(75) Inventor: Monika H. Henzinger, Attalens (CH)

(73) Assignee: Google Inc., Mountain View, CA (US)

( * ) Notice: Subject to any disclaimer, the term of this patent is extended or adjusted under 35 U.S.C. 154(b) by 287 days.

(21) Appl. No.: 11/499,260

(22) Filed: Aug. 4, 2006

(65) Prior Publication Data

US 2008/0044016 A1 Feb. 21, 2008

(51) Int. Cl.
*G06F 7/02* (2006.01)
(52) U.S. Cl. ............................ 707/692; 707/749; 726/32
(58) Field of Classification Search .................. 707/664, 707/692, 749; 726/32
See application file for complete search history.

(56) References Cited

U.S. PATENT DOCUMENTS

| | | | |
|---|---|---|---|
| 5,465,299 A | 11/1995 | Matsumoto et al. | |
| 5,745,900 A | 4/1998 | Burrows | |
| 5,778,395 A | 7/1998 | Whiting et al. | |
| 5,850,490 A | 12/1998 | Johnson | |
| 5,909,677 A | 6/1999 | Broder et al. | |
| 6,052,693 A | 4/2000 | Smith et al. | |
| 6,088,707 A | 7/2000 | Bates et al. | |
| 6,119,124 A * | 9/2000 | Broder et al. | 707/103 R |
| 6,134,532 A | 10/2000 | Lazarus et al. | |
| 6,230,155 B1 | 5/2001 | Broder et al. | |
| 6,240,409 B1 | 5/2001 | Aiken | |
| 6,263,348 B1 | 7/2001 | Kathrow | |
| 6,285,999 B1 | 9/2001 | Page | |
| 6,349,296 B1 | 2/2002 | Broder et al. | |
| 6,360,215 B1 | 3/2002 | Judd | |
| 6,363,377 B1 | 3/2002 | Kravets et al. | |
| 6,381,601 B1 | 4/2002 | Fujiwara et al. | |
| 6,505,160 B1 | 1/2003 | Levy et al. | |
| 6,658,423 B1 | 12/2003 | Pugh et al. | |
| 6,665,661 B1 | 12/2003 | Crow et al. | |
| 6,850,252 B1 | 2/2005 | Hoffberg | |
| 6,871,200 B2 * | 3/2005 | MacQueen et al. | 707/6 |
| 6,873,982 B1 | 3/2005 | Bates et al. | |
| 6,912,505 B2 | 6/2005 | Linden et al. | |
| 6,978,419 B1 | 12/2005 | Kantrowitz | |
| 7,366,718 B1 | 4/2008 | Pugh et al. | |
| 7,472,121 B2 * | 12/2008 | Kothari et al. | 707/6 |
| 7,739,314 B2 | 6/2010 | Datar et al. | |

(Continued)

OTHER PUBLICATIONS

Charikar, Moses, "Similarity Estimation Techniques from Rounding Algorithms", 2002, pp. 380-388, obtained from ACM.*

(Continued)

*Primary Examiner* — Jeffrey D Popham
(74) *Attorney, Agent, or Firm* — Fish & Richardson P.C.

(57) ABSTRACT

Near-duplicate documents may be identified by processing an accepted set of documents to determine a first set of near-duplicate documents using a first technique, and processing the first set to determine a second set of near-duplicate documents using a second technique. The first technique might be token order dependent, and the second technique might be order independent. The first technique might be token frequency independent, and the second technique might be frequency dependent. The first technique might determine whether two documents are near-duplicates using representations based on a subset of the words or tokens of the documents, and the second technique might determine whether two documents are near-duplicates using representations based on all of the words or tokens of the documents. The first technique might use set intersection to determine whether or not documents are near-duplicates, and the second technique might use random projections to determine whether or not documents are near-duplicates.

63 Claims, 5 Drawing Sheets

U.S. PATENT DOCUMENTS

| | | | |
|---|---|---|---|
| 2003/0061233 | A1 | 3/2003 | Manasse et al. |
| 2004/0139072 | A1 | 7/2004 | Broder et al. |
| 2004/0210575 | A1* | 10/2004 | Bean et al. .................... 707/6 |
| 2005/0165800 | A1* | 7/2005 | Fontoura et al. ............ 707/100 |
| 2006/0101060 | A1 | 5/2006 | Li et al. |
| 2007/0038659 | A1 | 2/2007 | Datar et al. |
| 2008/0162478 | A1 | 7/2008 | Pugh et al. |

OTHER PUBLICATIONS

PCT/ISA/220, "Notification of Transmittal of the International Search Report and the Written Opinion of the International Searching Authority, or the Declaration" for PCT/US07/17487, mailed Sep. 22, 2008 (1 pg.)

PCT/ISA/210, "International Search Report" for PCT/US07/17487, mailed Sep. 22, 2008 (2 pgs.)

PCT/ISA/237, "Written Opinion of the International Searching Authority" for PCT/US07/17487, mailed Sep. 22, 2008 (9 pgs.)

International Search Report and Written Opinion for Application No. PCT/US2006/031868, mailed Jul. 2, 2008, 14 pages.

International Preliminary Report on Patentability for Application No. PCT/US2006/031868, mailed Apr. 30, 2009, 10 pages.

Canadian Office Action for Application No. 2,660,202, dated Dec. 1, 2009, 3 pages.

Brin, S. et al, "The Anatomy of a Large-Scale Hypertextual Search Engine", Seventh International World Wide Web Conference, Apr. 14-18, 1998, Brisbane, Australia, 20 pgs.

Chinese Office Action for Application No. 200780036634.0, dated May 18, 2010, 12 pgs.

Fetterly, M., et al., "Detecting Phrase-Level Duplication on the World Wide Web", 28th Annual International ACM SIGIR Conference, Aug. 2005, 8 pgs.

Heintze, N., "Scalable Document Fingerprinting", Proc. of the 2nd USENIX Workshop on Electronic Commerce, Nov. 1996, 10 pgs.

Manber, U., "Finding similar files in a large file system", Proc. of the USENIX Winter 1994 Technical Conference, Jan. 1994, 11 pgs.

Rabin, M., "Fingerprinting by random polynomials", Report TR-15-81, Center for Research in Computing Technology, Harvard University, 1981, 14 pgs.

A. Broder et al., "Min-Wise Independent Permutations, Journal of Computer Systems and Sciences," vol. 60(3), pp. 630-659 (2000) (special issue for STOC '98), preliminary version in Proceedings of the 30th Annual ACM Symposium on Theory of Computing (1998).

Andoni et al., "Locality-sensitive hashing using stable distributions," Nearest Neighbor Methods in Learning and Vision: Theory and Practice, Darrell et al. (eds.), MIT Press, Cambridge, MA, in preparation, Chapter 4, pp. 55-67, 2006.

Andrei Z. Broder, "On the resemblance and containment of documents," Proc. of Compression and Complexity of Sequences 1997, pp. 21-29 (IEEE Computer Society), pp. 1-9.

Andrei Z. Broder, "Some applications of Rabin's fingerprinting method," R. Capocelli, A. DeSantis, U. Vaccaro, Eds; Sequences II: Methods in Communications, Security, and Computer Science, pp. 143-152 (Springer-Verlag, 1993).

Andrei Z. Broder, Steven C. Glassman, Mark S. Manasse, Geoffrey Swieg, "Syntactic Clustering of the Web," Proc. 6th Int'l. World Wide Web Conf., pp. 391-404 (Apr. 1997) and SRC Technical Note 1997-015 (Jul. 25, 1997), http://gatekeeper.dec.com/pub/DEC/SRC/technical-notes/SRC-1997-105-html/, Nov. 27, 2000, pp. 1-14.

Charikar et al., "Incremental Clustering and Dynamic Information Retrieval," STOC '97, 1997, El Paso, TX, pp. 626-635.

Cohen, "Size-Estimation Framework with Applications to Transitive Closure and Reachability," J. Comput. System Sci., 1997, 55(3), pp. 441-453.

E. Cohen et al., "Finding Interesting Associations Without Support Pruning," 16th International Conference on Data Engineering (ICDE), 2000.

Fetterly et al., "On the Evolution of Clusters of Near-Duplicate Web Pages", 9 pages, 2003.

Haveliwala et al., "Scalable Techniques for Clustering the Web," Proceedings of WebDB, 2000, 6 pages.

Hoad, Timothy C. et al., "Methods for Identifying Versioned and Plagiarised Documents", RMIT University, School of Computer Science and Information Technology, 18 pages, 2003.

Indyk and Motwani, "Approximate Nearest Neighbors: Towards Removing the Curse of Dimensionality," Proceedings of the 30th Annual ACM Symposium on Theory of Computing, 1998, 20 pages.

Jeffrey Dean et al., "MapReduce: Simplified Data Processing on Large Clusters," OSDI, 2004.

M. Datar et al., "Locality-Sensitive Hashing Scheme Based on p-Stable Distributions," SCG'04, Jun. 9-11, 2004.

Min Fang, Narayanan Shivakumar, Hector Garcia-Molina, Rajeev Motwanti, Jeffrey D. Ullman, "Computing Iceberg Queries Efficiently," Proc. 24th Int'l Conf. on Very Large Databases, pp. 299-310 (1998).

Papadimitriou et al., "Latent Semantic Indexing: A Probabilistic Analysis," PODS '98, (preliminary version) JCSS, special edition (full version), Nov. 14, 1997, 21 pages.

Schwab and Kobsa, "Adaptivity through Unobtrusive Learning," 2002, 16(3), pp. 5-9.

Sergey Brin, James Davis, Hector Garcia-Molina, "Copy Detection Mechanisms for Digital Documents," Proc. of ACM SIGMOD Annual Conf. (San Jose, 1995), http://www-db.stanford.edu/~sergey/copy.html on Nov. 27, 2000, pp. 1-21.

Xiao et al., "Measuring Similarity of Interests for Clustering Web-Users," ADC, 2001, pp. 107-114.

Xie and Phoha, "Web User Clustering from Access Log Using Belief Function," K-CAP '01, Oct. 22-23, 2001, Victoria, British Columbia, Canada, pp. 202-208.

Chinese Office Action issued for Application No. 200680038100.7, mailed Oct. 8, 2010, 9 pgs.

Chinese Office Action issued for Application No. 200780036634.0, mailed Nov. 30, 2010, 5 pgs.

European Search Report in Application No. 06801549.4, mailed Dec. 8, 2010, 10 pages. 10 pgs.

* cited by examiner

100

DETECTING DUPLICATE AND NEAR-DUPLICATE FILES

§1. BACKGROUND OF THE INVENTION

§1.1 Field of the Invention

The present invention concerns information management and retrieval in general. More specifically, the present invention concerns detecting, and optionally removing, duplicate and near-duplicate information or content, such as in a repository of documents to be searched for example.

§1.2 Background Information

In the following, the term "document(s)" should be broadly interpreted and may include content such as Web pages, text files, multimedia files, object features, link structure, etc. Also, it should be noted that when near-duplicate documents are detected, exact duplicate documents will also be detected as a consequence (though such exact duplicates might not necessarily be distinguished from near-duplicates).

Detecting near-duplicate documents has many potential applications. For example, duplicate or near-duplicate documents may indicate plagiarism or copyright infringement. One important application of near-duplicate document detection is in the context of information storage and retrieval.

Efficient techniques to detect documents that are exact duplicates exist. Detecting whether or not documents are near-duplicates is more difficult, particularly in large collections of documents. For example, the Internet, collectively, includes literally billions of "Web site" documents.

Sources of duplicate and near-duplicate documents on the Internet are introduced in §1.2.1 below. Then, problems that these duplicate and near-duplicate documents raise, both for end-users and for entities assisting end-users, are introduced in §1.2.2 below. Finally, previous techniques for detecting duplicate and near-duplicate documents in the context of large document collections, as well as perceived shortcomings of such techniques, are introduced in §1.2.3 below.

§1.2.1 Sources of Duplicate and Near-Duplicate Documents on the Internet

On the Internet, the World Wide Web (referred to as "the Web") may include the same document duplicated in different forms or at different places. (Naturally, other networks, or even stand alone systems, may have duplicate documents.) Sources of such duplication are introduced here.

First, some documents are "mirrored" at different sites on the Web. Such mirroring is used to alleviate potential delays when many users attempt to request the same document at the same time, and/or to minimize network latency (e.g., by caching Web pages locally).

Second, some documents will have different versions with different formatting. For example, a given document may have plain text and HTML (hyper-text markup language) versions so that users can render or download the content in a form that they prefer. As more and more different devices (e.g., computers, mobile phones, personal digital assistants, etc.) are used to access the Internet, a given document may have more and more different versions with different formatting (text only, text plus other media, etc.).

Third, documents are often prepended or appended with information related to its location on the Web, the date, the date it was last modified, a version, a title, a hierarchical classification path (e.g., a Web page may be classified under more than one class within the hierarchy of a Web site), etc.

Fourth, in some instances a new document is generated from an existing document using a consistent word replacement. For example, a Web site may be "re-branded" for different audiences by using word replacement.

Finally, some Web pages aggregate or incorporate content available from another source on the Web.

§1.2.2 Problems Raised by Duplicate and Near-Duplicate Documents

Duplicate and near-duplicate documents raise potential problems for both people accessing information (e.g., from the Web) and entities helping people to access desired information (e.g., search engine companies). These potential problems are introduced below.

Although people continue to use computers to enter, manipulate and store information, in view of developments in data storage, internetworking (e.g., the Internet), and inter-linking and cross referencing of information (e.g., using hyper-text links), people are using computers (or more generally, information access machines) to access information to an ever increasing extent.

Search engines have been employed to help users find desired information. Search engines typically search database content or "Websites" or "Web pages" pursuant to a user query. In response to a user's query, a rank-ordered list, which typically includes brief descriptions of the uncovered content, as well as hyper-texts links (i.e., text, having associated URLs) to the uncovered content, is returned. The rank-ordering of the list is typically based on a match between words appearing in the query and words appearing in the content.

From the perspective of users, duplicate and near-duplicate documents raise problems. More specifically, when users submit a query to a search engine, most do not want links to (and descriptions of) Web pages which have largely redundant information. For example, search engines typically respond to search queries by providing groups of ten results. If pages with duplicate content were returned, many of the results in one group may include the same content. Thus, there is a need for techniques to avoid providing search results associated with (e.g., having links to) Web pages having duplicate content.

From the perspective of entities hosting search engines, duplicate and near-duplicate documents also raise problems—giving end-users what they want, being one of them. To appreciate some of the other potential problems raised by duplicate and near-duplicate documents, some search engine technology is introduced first.

Most search engines perform three main functions: (i) crawling the Web; (ii) indexing the content of the Web; and (iii) responding to a search query using the index to generate search results. Given the large amount of information available, these three main functions are automated to a large extent. While the crawl operation will associate words or phrases with a document (e.g., a Web page), the indexing operation will associate document(s) (e.g., Web page(s)) with words or phrases. The search operation then (i) uses that index to find documents (e.g., Web pages) containing various words of a search query, and (ii) ranks or orders the documents found in accordance with some heuristic(s).

Recall that the Web may include the same documents duplicated in different forms or at different places on the Web. For example, as introduced in §1.2.1 above, documents may be "mirrored" at different sites on the Web, documents may have a number of different formats so that users can render or download the content in a form that they prefer, documents may have a different versions with different information prepended or appended, some documents may have been generated from others using consistent word replacement, and some documents may aggregate or incorporate documents available from another source on the Web. It would be desirable to eliminate such duplicates or near-duplicates.

Besides eliminating duplicate or near-duplicate documents to meet user expectations and wishes, eliminating duplicate or near-duplicate documents is desirable to search engine hosting entities to (i) reduce storage requirements (e.g., for the index and data structures derived from the index), and (ii) reduce the time and/or computational resources needed to process indexes, queries, etc.

In view of the foregoing, techniques to detect (and eliminate) near-duplicate documents are needed.

§1.2.3 Known Techniques for Detecting Duplicate and Near-Duplicate Documents and their Perceived Limitations A naive solution would be to compare all pairs to documents. Since this is prohibitively expensive on large datasets, Manber (U. Manber, "Finding similar files in a large file system," *Proc. of the USENIX Winter* 1994 *Technical Conference* (January 1994)) and Heintze (N. Heintze, "Scalable Document Fingerprinting," *Proc. of the 2nd USENIX Workshop on Electronic Commerce* (November 1996)) proposed algorithms for detecting near-duplicate documents that reduced the number of comparisons. Both algorithms work on sequences of adjacent characters. Brin et al. (S. Brin, J. Davis, and H. Garcia-Molina, "Copy Detection Mechanisms for Digital Documents," 1995 *ACM SIGMOD International Conference on Management of Data*, pp. 398-409 (May 1995)) started to use word sequences to detect copyright violations. Broder et al. (A. Broder, S. Glassman, M. Manasse, and G. Zweig, "Syntactic Clustering of the Web," *6th International World Wide Web Conference*, pp. 93-404 (April 1997), incorporated herein by reference) also used word sequences to efficiently find near-duplicate Web pages. Later, Charikar (M. S. Charikar, "Similarity Estimation Techniques from Rounding Algorithms," 34*th Annual ACM Symposium on Theory of Computing* (May 2002), incorporated herein by reference. See also U.S. Patent Application Publication 2006/0101060, also incorporated herein by reference.) developed an approach based on random projections of the words in a document. Recently Hoad and Zobel (T. C. Hoad and J. Zobel, "Methods for identifying versioned and plagiarised documents," *Journal of the American Society for Information Science and Technology*, 54(3), pp. 203-215 (2003)) developed and compared methods for identifying versioned and plagiarized documents. Unfortunately, however, the technique recommended by Hoad and Zobel is inefficient, having $O(N^2)$ computational complexity, where N is the number of documents to be compared with a document of interest.

§1.2.3.1 Introduction of the Broder and Charikar Algorithms for Document Similarity In both the Broder and Charikar algorithms, each HTML page is converted into a token sequence. The two algorithms differ only in how they convert the token sequence into a bit string representing the page.

To convert an HTML page into a token sequence, all HTML markup in the page is replaced by white space or, in case of formatting instructions, ignored. Then every maximal alphanumeric sequence is considered a term and is hashed using Rabin's fingerprinting scheme (M. Rabin, "Fingerprinting by random polynomials," *Report TR*-15-81, Center for Research in Computing Technology, Harvard University (1981), incorporated herein by reference) to generate tokens, with two exceptions.

Both algorithms generate a bit string from the token sequence of a page and use it to determine the near-duplicates for the page.

Let n be the length of the token sequence of a page. Using the Broder algorithm every sub-sequence of k tokens (where the sub-sequences overlap) is fingerprinted using 64-bit Rabin fingerprints, which results in a sequence of (n–k+1) fingerprints, called "shingles". Let S (d) be the set of shingles of the page "d". The Broder algorithm makes the assumption that the percentage of unique shingles on which the two pages d and d' agree. That is, the Broder algorithm assumes that $$\frac{|S(d) \cap S(d')|}{|S(d) \cup S(d')|}$$

is a good measure for the similarity of d and d'.

The foregoing may be approximated by fingerprinting every shingle with m different fingerprinting functions $f_i$ for $1 \leq i \leq m$. This leads to (n–k+1) values for each $f_i$. For each i, the smallest of these values is called "the i-th minvalue" and is stored at the page. As a result, the Broder algorithm creates an m-dimensional vector of minvalues. Broder et al. showed that the expected percentage of entries in the minvalues vector that two pages d and d' agree on is equal to the percentage of unique shingles on which d and d' agree. Thus, to estimate the similarity of two pages, it suffices to determine the percentage of agreeing entries in the minvalues vectors. To save space and speed up the similarity computation, the m-dimensional vector of minvalues might be reduced to an m'-dimensional vector of supershingles by fingerprinting non-overlapping sequences of minvalues. Let m be divisible by m' and let $\ell$=m/m'. The concatenation of minvalue j *$\ell$, . . . , (j+1)*$\ell$–1 might be fingerprinted for 0≦•j<m' with yet another fingerprinting function. (Note that the notion of "megashingles" was also introduced in the Broder et al. paper in order to further speed up the algorithm. Megashingles are generated by fingerprinting every pair of supershingles, such that each megashingle is a fingerprinted pair of supershingles. Since, however, using megashingles does not improve precision or recall, they need not be used.) Two pages are near-duplicates under the Broder algorithm (referred to here as "B-similar") if and only if their supershingle vectors agree in at least two supershingles. The number of identical entries in the supershingle vectors of two pages is their "B-similarity". The parameters for the Broder algorithm are m, $\ell$m', and k.

As can be appreciated from the foregoing, the Broder algorithm is order dependent (e.g., since the shingles are fingerprints of overlapping sub-sequences), but is independent of the frequency of the shingles.

The Charikar algorithm is now described. Let b be a constant. Each token is projected into b-dimensional space by randomly choosing b entries from {–1, 1 }. The resulting b-dimensional vector may be referred to as a "token vector". The same tokens, whether occurring on the same page or on different pages, will have the same b-dimensional representation (i.e., the same "token vector"). For each page, a representative b-dimensional vector (which may be referred to as an "initial page vector") is created by adding the projections of all the tokens in the page's token sequence (i.e., adding all of the page's "token vectors"). The final vector for the page (which may be referred to as a "final page vector") is created by setting every positive entry in the vector to 1 and every non-positive entry to 0. The generates a random b-dimensional projection (i.e., a final page vector) for each page. The final page vectors have the property that the cosine similarity of two pages is proportional to the number of bits in which the two corresponding projections agree. That is, similarity in the Charikar algorithm (referred to as "C-similarity") of two Web pages is the number of bits their projections agree on. Two pages are near-duplicates in the Charikar algorithm (or are C-similar) if the number of agreeing bits in their projections is above a fixed threshold t.

As can be appreciated from the foregoing, given the definition of minvalues (from which supershingles, and perhaps even megashingles, are generated), Broder's technique uses representations based on a subset of the words (or tokens) of the original document being analyzed. On the other hand, Charikar's technique uses representations based on all words (not removed by preprocessing) (or tokens) of the original document being analyzed. That is, Charikar's technique might consider all words (or tokens) of documents accepted as inputs. Further, Broder's technique uses set intersection to determine whether or not documents are near-duplicates. On the other had, Charikar's technique uses random projections to determine whether or not documents are near-duplicates.

As can be appreciated from the foregoing, in both algorithms pages with the same token sequence are assigned the same bit string. The Charikar algorithm ignores the order of the tokens (given the additive aspect of generating a page vector from token vectors). The shingles of the Broder algorithm are based on the order of the tokens. However, the Broder algorithm ignores the frequency of shingles. On the other hand, the Charikar algorithm accounts for the frequency of terms (again, given the additive aspect of generating a page vector from token vectors). For both algorithms there can be false positives (non near-duplicate pairs returned as near-duplicates) as well as false negatives (near-duplicate pairs not returned as near-duplicates.)

Let T be the sum of the number of tokens in all documents and let D be the number of documents. The Broder algorithm takes time $O(Tm+Dm')=O(Tm)$. The Broder algorithm takes time $O(Tb)$ to determine the vector for each page. As described below, the C-similar pairs might be computed using a trick similar to supershingles. It takes time $O(D)$ so that the total time for the Charikar algorithm is $O(Tb)$.

Some embodiments consistent with the present invention might further (d) process the set of documents to determine a third set of near-duplicate documents using the second document similarity technique, (e) determine a fourth set of near duplicate documents by determining the union of the second set of near duplicate document and the third set of near-duplicate documents.

§1.2.3.2 Evaluation of the Broder and Charikar Algorithms

The present inventor evaluated the Broder and Charikar algorithms on 1.6 B distinct Web pages, according to three criteria—(1) precision on a random subset, (2) the distribution of the number of term differences per near-duplicate pair, and (3) the distribution of the number of near-duplicates per page. All parameters in the Broder algorithm were set as suggested in the literature. The parameters in the Charikar algorithm were chosen so that it used the same amount of space per document and returned about the same number of correct near-duplicate pairs (i.e., had about the same recall).

The present inventor found that the Charikar algorithm achieved a precision of 0.50, while the Broder algorithm achieved a precision of 0.38. Both algorithms were found to perform about the same for near-duplicate pairs on the same site (low precision) and for near-duplicate pairs on different sites (high precision). However, over 90% of the near-duplicate pairs found by the Broder algorithm belonged to the same site, but only 74% of the near-duplicate pairs found by the Charikar algorithm belonged to the same site.

Thus, the Charikar algorithm found more of the near-duplicate pairs for which precision is high. The number of term differences per near-duplicate pair was found to be very similar for the two algorithms, but the Broder algorithm returned fewer pairs with extremely large term differences. The distribution of the number of near-duplicates per page was found to follow a power-law for both algorithms. However, the Broder algorithm was found to have a higher "spread" around the power-law curve. The present inventor believes that a possible reason for that "noise" is that the bit string representing a page in the Broder algorithm is based on a randomly selected subset of terms in the page. Thus, there might be "lucky" and "unlucky" choices, leading to false near-duplicate pairs or missing actual near-duplicate pairs. The Charikar algorithm does not select a subset of terms but is based on all terms in the page.

The present inventor found that neither of the algorithms worked well for finding near-duplicate pairs on the same Website, though both achieved high precision for near-duplicate pairs on different Websites.

In view of the foregoing, it would be useful to provide improved techniques for finding near-duplicate documents. It would be useful if such techniques improved the precision of the Broder and Charikar algorithms. Finally, it would be useful if such techniques worked well for finding near-duplicate pairs on the same Website, as well as on different Websites.

§2. SUMMARY OF THE INVENTION

Some embodiments consistent with the present invention might detect near-duplicate documents by (a) accepting a set of documents, (b) processing the set of documents to determine a first set of near-duplicate documents using a first document similarity technique, and (c) processing the first set of near duplicate documents to determine a second set of near-duplicate documents using a second document similarity technique.

In at least some embodiments consistent with the present invention, the first document similarity technique might be token order dependent, and the second document similarity technique might be order independent.

In at least some embodiments consistent with the present invention, the first document similarity technique might be token frequency independent, and the second document similarity technique might be frequency dependent.

In at least some embodiments consistent with the present invention, the first document similarity technique might determine whether two documents are near-duplicates using representations based on a subset of the words or tokens of the documents, and the second document similarity technique might determine whether two documents are near-duplicates using representations based on all of the words or tokens of the documents.

In at least some embodiments consistent with the present invention, the first document similarity technique might use set intersection to determine whether or not documents are near-duplicates, and the second document similarity technique might use random projections to determine whether or not documents are near-duplicates.

At least some other embodiments consistent with the present invention might identify near-duplicate documents by (a) accepting a set of documents, and (b) processing the set of documents to determine near-duplicate documents, wherein a first document similarity technique is used to determine near-duplicate documents for documents from the same Website, and wherein a second document similarity technique is used to determine near-duplicate documents for documents from different Websites.

§3. BRIEF DESCRIPTION OF THE DRAWINGS

§4. DETAILED DESCRIPTION

The present invention may involve novel methods, apparatus, message formats, and/or data structures for determining whether or not documents are similar. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. In the following, "information" may refer to the actual information, or a pointer to, or a location of, such information. Thus, the present invention is not intended to be limited to the embodiments shown and the inventor regards her invention to include any patentable subject matter described.

In the following, environments in which the present invention may be employed are introduced in §4.1. Then, exemplary embodiments consistent with the present invention are described in §4.2. Finally, some conclusions about the present invention are set forth in §4.3.

§4.1 Exemplary Environments in which Invention May Operate

The following exemplary embodiments are presented to illustrate examples of utility of embodiments consistent with the present invention and to illustrate examples of contexts in which such embodiments may operate. However, the present invention can be used in other environments and its use is not intended to be limited to the exemplary environment 100 and search facility 200 introduced below with reference to FIGS. 1 and 2, respectively.

Figure 1:
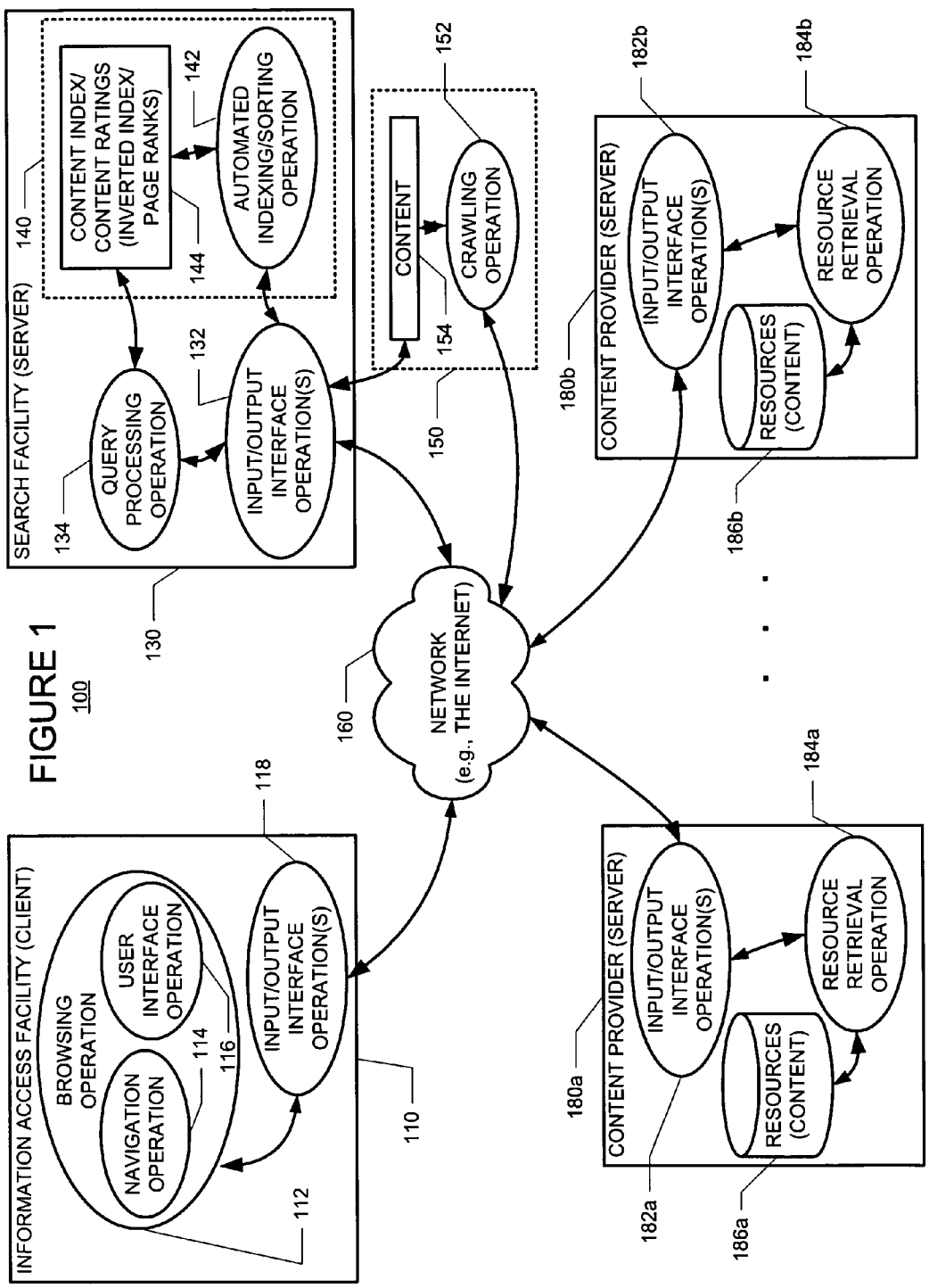
FIG. 1 is a block diagram of an environment in which at least some aspects of the present invention may be used.

FIG. 1 is a block diagram of an environment 100 in which at least some aspects of the present invention may be used. This environment 100 may be a network (such as the Internet for example) 160 in which an information access facility (client) 110 is used to render information accessed from one or more content providers (servers) 180. A search facility (server) 130 may be used by the information access facility 110 to search for content of interest.

The information access facility 110 may include a browsing operation 112 which may include a navigation operation 114 and a user interface operation 116. The browsing operation 112 may access the network 160 via input/output interface operations 118. For example, in the context of a personal computer, the browsing operation 112 may be a browser (such as "Firefox" from Mozilla, "Internet Explorer" from Microsoft Corporation of Redmond, Wash., "Opera" from Opera Software, "Netscape" from Time Warner, Inc.) and the input/output interface operations may include a modem or network interface card (or NIC) and networking software. Other examples of possible information access facilities 110 include untethered devices, such as personal digital assistants and mobile telephones for example, set-top boxes, kiosks, etc.

Each of the content providers 180 may include stored resources (also referred to as content) 136, a resource retrieval operation 184 that accesses and provides content in response to a request, and input/output interface operation(s) 182. These operations of the content providers 180 may be performed by computers, such as personal computers or servers for example. Accordingly, the stored resources 186 may be embodied as data stored on some type of storage medium such as a magnetic disk(s), an optical disk(s), etc. In this particular environment 100, the term "document" may be interpreted to include addressable content, such as a Web page for example.

The search facility 130 may perform crawling, indexing/sorting, and query processing functions. These functions may be performed by the same entity or separate entities. Further, these functions may be performed at the same location or at different locations. In any event, at a crawling facility 150, a crawling operation 152 gets content from various sources accessible via the network 160, and stores such content, or a form of such content, as indicated by 154. Then, at an automated indexing/sorting facility 140, an automated indexing/sorting operation 142 may access the stored content 154 and may generate a content index (e.g., an inverted index, to be described below) and content ratings (e.g., PageRanks, to be described below) 140. Finally, a query processing operation 134 accepts queries and returns query results based on the content index (and the content ratings) 140. The crawling, indexing/sorting and query processing functions may be performed by one or more computers.

Figure 2:
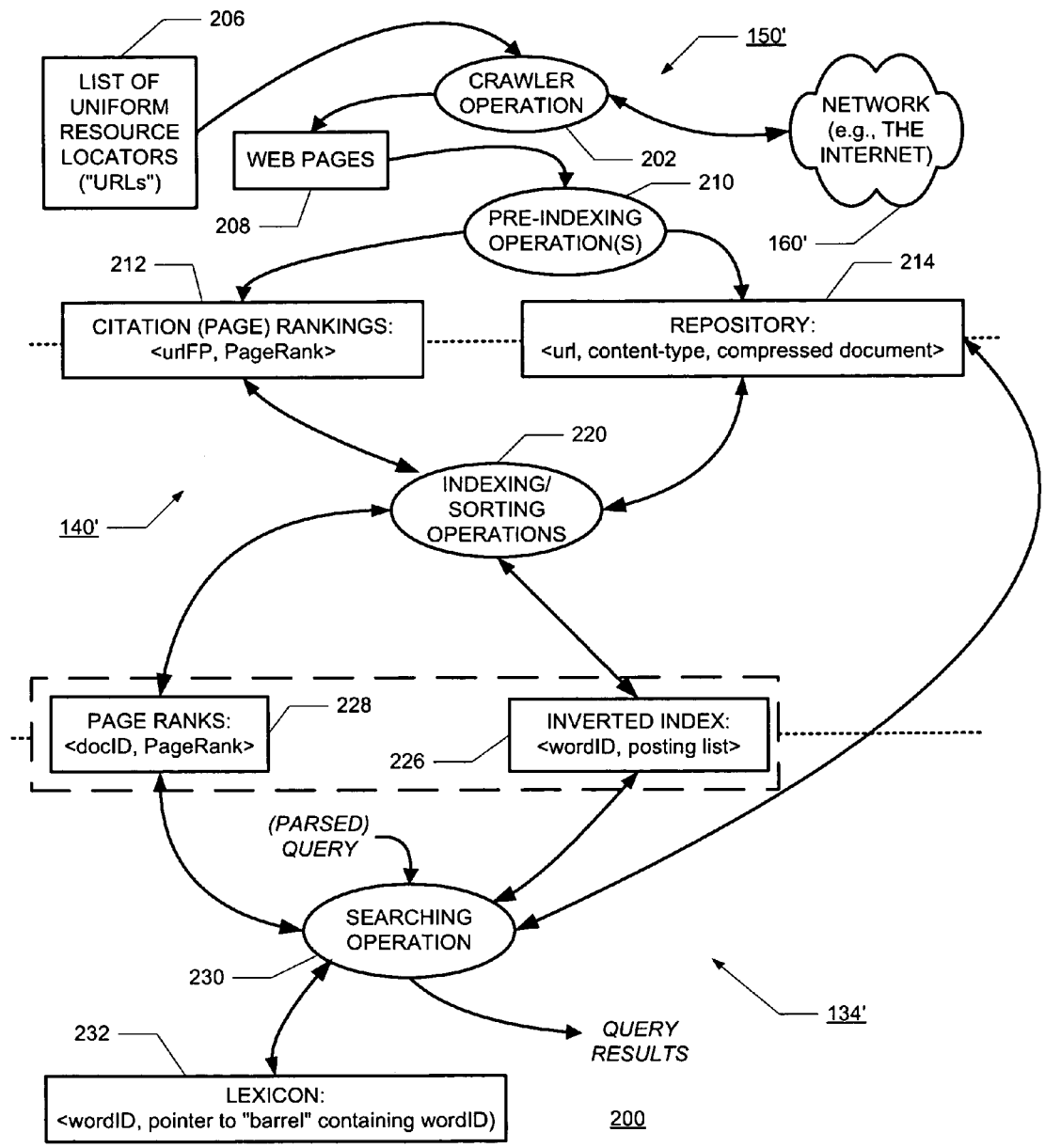
FIG. 2 is a process bubble diagram of an advanced search facility in which at least some aspects of the present invention may be used.

Although embodiments consistent with the present invention may be used with a number of different types of search engines, it might be used with an advanced search facility, such as the one presently available from Google, Inc. of Mountain View, Calif. FIG. 2 is a process bubble diagram of such an advanced search facility 200 in which at least some aspects of embodiments consistent with the present invention may be used.

The advanced search facility 200 illustrated in FIG. 2 performs three main functions: (i) crawling; (ii) indexing/sorting; and (iii) searching. The horizontal dashed lines divide FIG. 2 into three parts corresponding to these three main functions. More specifically, the first part 150' corresponds to the crawling function, the second part 140' corresponds to the indexing/sorting function, and the third part 134' corresponds to the search (or query processing) function. (Note that an apostrophe following a reference number is used to indicate that the referenced item is merely one example of the item referenced by the number without an apostrophe.) Each of these parts is introduced in more detail below. Before doing so, however, a few distinguishing features of this advanced search facility 200 are introduced.

The advanced search facility uses the link structure of the Web, as well as other techniques, to improve search results. (See, e.g., U.S. Pat. No. 6,285,999 and the article S. Brin and L. Page, "The Anatomy of a Large-Scale Hypertextual Search Engine," *Seventh International World Wide Web Conference*, Brisbane, Australia, both incorporated herein by reference.)

Referring back to FIG. 2, the three main parts of the advanced search engine 200 are now described further.

The crawling part 150' may be distributed across a number of machines. A single URL server (not shown) serves lists of uniform resource locations ("URLs") 206 to a number of crawlers. Based on this list of URLs 206, the crawling operation 202 crawls the network 160' and gets Web pages 208. A pre-indexing operation 210 may then generate page rankings 212, as well as a repository 214 from these Web pages 208. The page rankings 212 may include a number of URL fingerprint (i.e., a unique value), PageRank value (as introduced above) pairs. The repository 214 may include URL, content type and compressed page triples.

Regarding the indexing/sorting part 140', the indexing/sorting operations 220 may generate an inverted index 226. The indexing/sorting operations 220 may also generate page ranks 228 from the citation rankings 212. The page ranks 228 may include document ID, PageRank value pairs.

Regarding the query processing part 134', the searching operations 230 may be run by a Web server and may use a lexicon 232, together with the inverted index 226 and the PageRanks 228, to generate query results in response to a query. The query results may be based on a combination of (i) information derived from PageRanks 228 and (ii) information derived from how closely a particular document matches the terms contained in the query (also referred to as the information retrieval (or "IR") component). Having described exemplary environments in which the present invention may be used, exemplary embodiments consistent with the present invention are now described in §4.2 below.

§4.2 Exemplary Embodiments

Exemplary methods consistent with the present invention are described in §4.2.1 below. Then, exemplary apparatus consistent with the present invention are described in §4.2.2 below. Finally, refinements alternative and extensions of such embodiments are described in §4.2.3 below.

§4.2.1 Exemplary Methods

Figure 3:
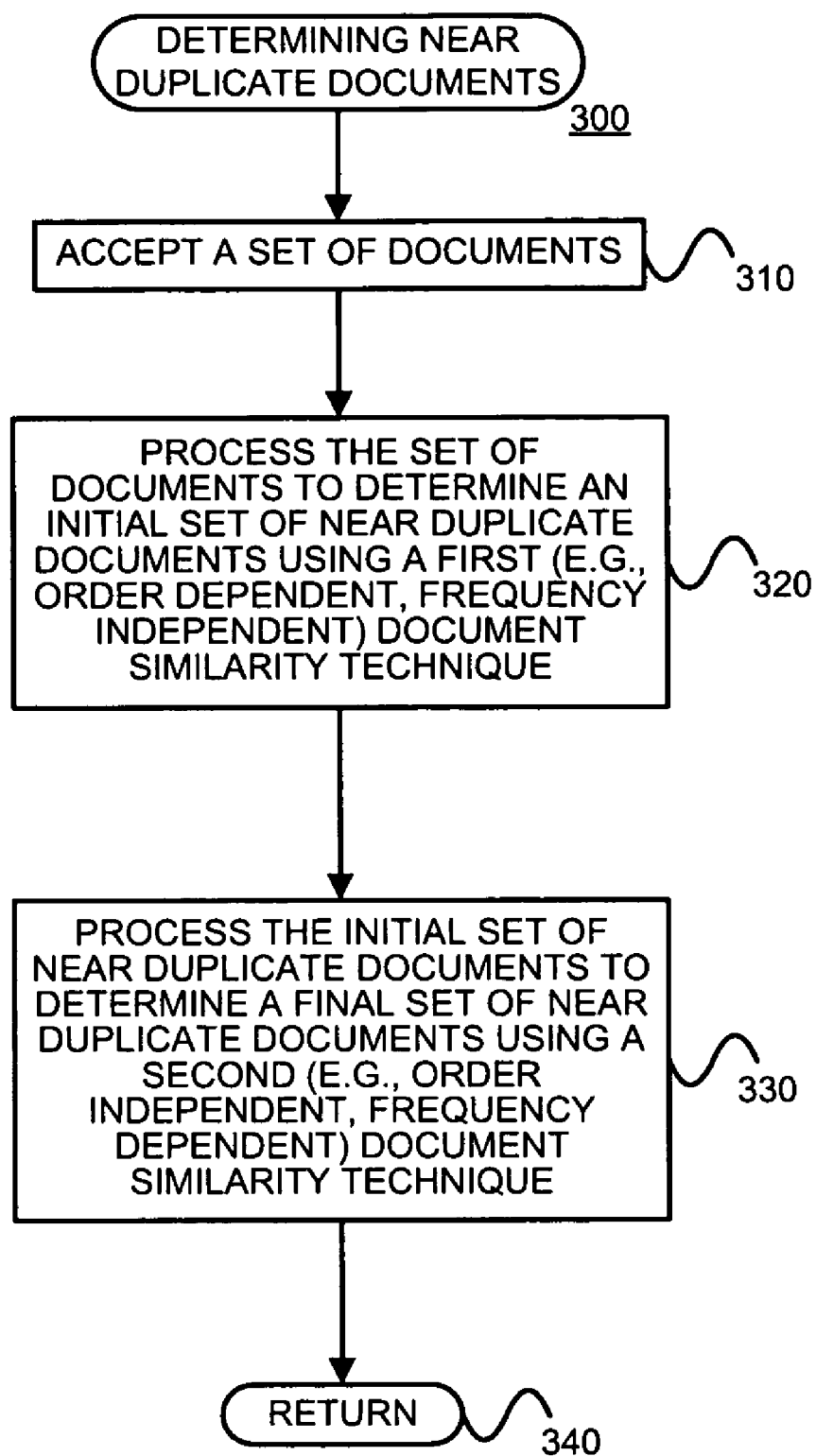
FIG. 3 is a flow chart of an exemplary method for determining near duplicate documents in a manner consistent with the present invention.

FIG. 3 is a flow chart of an exemplary method 300 for determining near duplicate documents in a manner consistent with the present invention. As shown, the exemplary method 300 accepts a set of documents. (Block 310) The set of documents might then be processed to determine an initial set of near duplicate documents using a first document similarity technique. (Block 320). Finally, the initial set of near duplicate documents might be processed to determine a final set of near duplicate documents using a second document similarity technique (Block 330) before the method 300 is left (Node 340).

Referring back to block 310, in some embodiments consistent with the present invention, the documents might be Web pages. In other embodiments consistent with the present invention, the documents might be a set of token sequence bit strings derived from source documents, such as Web pages for example.

Referring back to block 320, in some embodiments consistent with the present invention, the first document similarity technique might be order dependent, and/or frequency independent (e.g., with respect to document words, document n-grams, document tokens, etc.).

Still referring to block 320, in some embodiments consistent with the present invention, the first document similarity technique might include (i) fingerprinting every sub-sequence of k tokens to generate (n−k+1) shingles, (ii) fingerprinting each shingle with m different fingerprinting functions $f_i$ for $1 \leq i \leq m$ to generate (n−k+1) values for each of the m fingerprinting functions $f_i$, (iii) determining, for each i, the smallest value to create an m-dimensional vector of minvalues, (iv) reducing the m-dimensional vector of minvalues to an m'-dimensional vector of supershingles by fingerprinting non-overlapping sequences of minvalues, and (v) concluding that two documents are near-duplicates if and only if their supershingle vectors agree in at least two supershingles (or, alternatively, if the two documents agree in at least one megashingle). The first document similarity technique might be any of the techniques described in the Broder paper introduced in §1.2.3 above or described in the Fetterly papers (D. Fetterly, M. Manasse, and M. Najork, "On the Evolution of Clusters of Near-Duplicate Web Pages," 1*st Latin American Web Congress*, pp. 37-45 (November 2003); and D. Fetterly, M. Manasse, and M. Najork, "Detecting Phrase-Level Duplication on the World Wide Web," 28*th Annual International ACM SIGIR Conference* (August 2005), both incorporated herein by reference). In such embodiments, the parameter m might be set to 84, the parameter l might be set to 14, the parameter m' might be set to 6 and the parameter k might be set to any value from 5 to 10 (e.g., 8). Some embodiments consistent with the present invention might use the following parameter values: m=84; $\ell$=14; m'=6; and k=some value from 5 to 10. Some embodiments consistent with the present invention might omit the wrapping of the shingling "window" from the end of the document, in which case (n−k+1) shingles are generated. If, on the other hand, the shingling window can wrap around from the end of the document to its beginning, n shingles are generated.

Referring back to block 330, in some embodiments consistent with the present invention, the second document similarity technique might be order independent, and/or frequency dependent (e.g., with respect to document words, document n-grams, document tokens, etc.).

Still referring to block 330, in some embodiments consistent with the present invention, the set of documents might be a set of token sequence bit strings, and the second document similarity technique might include (i) projecting each token into b-dimensional space by randomly choosing a predetermined number b of entries from {−1, 1}, (ii) for each document, creating a b-dimensional vector by adding the projections of all the tokens in its token sequence, and creating a final vector for the document by setting every positive entry in the b-dimensional vector to 1 and every non-positive entry to 0, and (iii) determining a similarity between two documents based on a number of bits that agree in corresponding projections of the two documents. The second document similarity technique might be any of the techniques described in the Charikar paper introduced in §1.2.3 above. In such embodiments, the parameter b might be set such that a bit string of 48 bytes is stored per document (e.g., b might be set to 384). Naturally, some embodiments consistent with the present invention might select a value for the parameter b to use less (or more) space.

In some embodiments consistent with the present invention, the second technique might operate on overlapping sequences of tokens (i.e., shingles) instead of on individual tokens.

Figure 4:
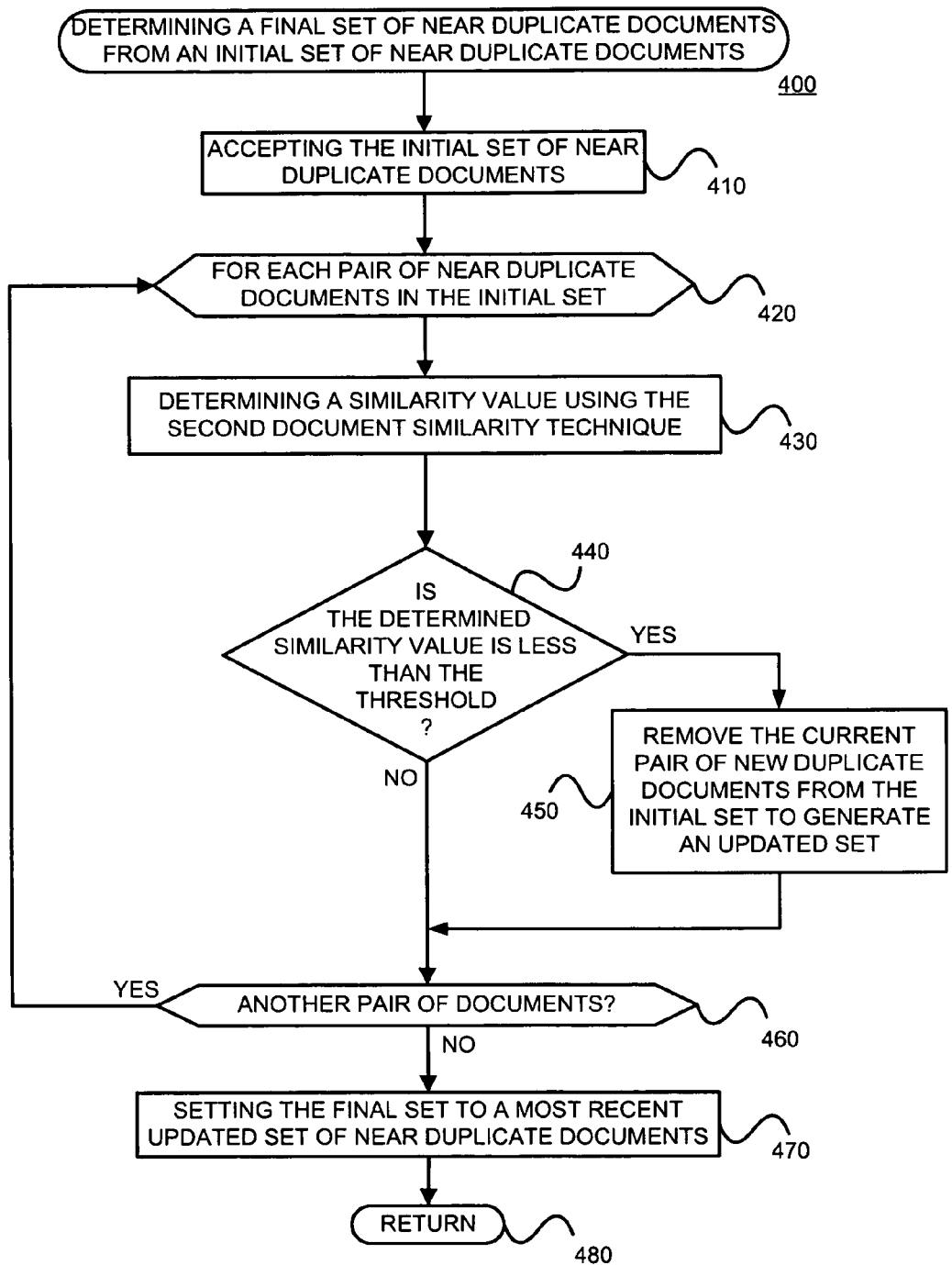
FIG. 4 is a flow chart of an exemplary method for determining a final set of near duplicate documents from an initial set of near duplicate documents in a manner consistent with the present invention.

Still referring to block 330 of FIG. 3, FIG. 4 is a flow chart of an exemplary method 400 for determining a final set of near duplicate documents from an initial set of near duplicate documents in a manner consistent with the present invention.

As shown, the exemplary method 400 might accept the initial set of near duplicate documents. (Block 410)

As indicated by loop 420-460, a number of acts might be performed for each pair of near duplicate documents in the initial set. Specifically, a similarity value might be determined using the second document similarity technique. (Block 430) Whether the determined similarity value is less than a threshold might then be determined. (Decision block 440) If it is determined that the determined similarity value is less than the threshold, then the current pair of near duplicate documents might be removed from the initial set to generate an updated set (Block 450) before the method 400 continues to block 460. If, on the other hand, it is determined that the determined similarity value is not less than the threshold, then the method 400 might directly proceed to block 460.

Referring to block 460, once all of the pairs of near duplicate documents in the initial set have been processed, the final set of near duplicate documents might be set to the most recent updated set of near duplicate documents (or to the initial set of near duplicate documents in the event that the determined similarity value was never less than the threshold) (Block 470) before the method 400 is left (Node 480).

Referring back to block 410, in some embodiments consistent with the present invention, the set of documents might be Web pages. Alternatively, the set of documents might be a set of token sequence bit strings.

Referring back to block 430, in some embodiments consistent with the present invention, the second document similarity technique might include (i) projecting each of a number of token sequence bit strings into b-dimensional space by randomly choosing a predetermined number b of entries from $\{-1,1\}$, (ii) for each document, creating a b-dimensional vector by adding the projections of all the tokens in its token sequence, and creating a final vector for the document by setting every positive entry in the b-dimensional vector to 1 and every non-positive entry to 0, and (iii) determining a similarity between two documents based on a number of bits that agree in corresponding projections of the two documents. Referring back to block 440, in such an embodiment, the predetermined number b might be 384 and the threshold might be set to 372. In some embodiments consistent with the present invention, the threshold might be set to approximately 97% (or at least 96%) of the predetermined number b. The predetermined number b might be a lower value. For example, setting b to values as low as 192 has provided good results. Indeed, the present inventor believes that setting b to values of 100 or even slightly less might provide adequate results. In these lower settings of b, the threshold might be set to about 97% of b, or at least 96% of b.

§4.2.2 Exemplary Apparatus

Figure 5:
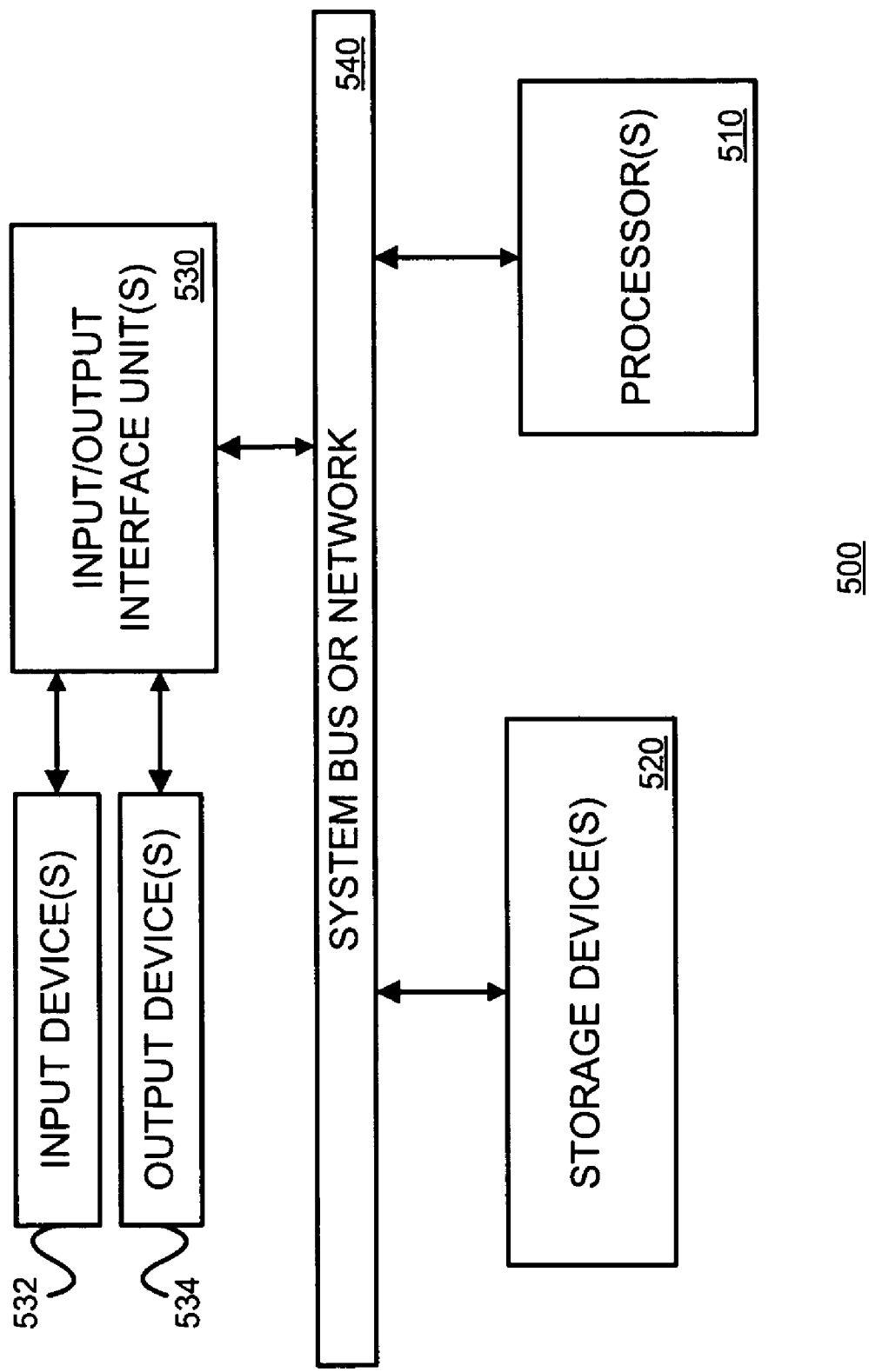
FIG. 5 is block diagram of a machine that may be used to perform one or more of the operations discussed above, and/or to store information generated and/or used by such operations, in a manner consistent with the present invention.

FIG. 5 is block diagram of a machine 500 that may be used to perform one or more of the operations discussed above, and/or to store information generated and/or used by such operations, in a manner consistent with the present invention. The machine 500 basically includes a processor(s) 510, an input/output interface unit(s) 530, a storage device(s) 520, and a system bus or network 540 for facilitating the communication of information among the coupled elements. An input device(s) 532 and an output device(s) 534 may be coupled with the input/output interface(s) 530.

The processor(s) 510 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the storage device(s) 520 and/or may be received from an external source via an input interface unit 530.

Some aspects of exemplary embodiments consistent with the present invention may be performed in the general context of computer-executable instructions, such as program modules, being executed by a personal computer. However, methods may be performed by (and data structures may be stored on) other apparatus. Program modules may include routines, programs, objects, components, data structures, etc. that perform an operation(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set-top boxes, mainframe computers, and the like. At least some aspects of the present invention may also be practiced in distributed computing environments where tasks are performed by remote processing devices linked through a communications network. In a distributed computing environment, program modules may be located in local and/or remote memory storage devices.

In one embodiment consistent with the present invention, the machine 500 may be one or more conventional personal computers or servers. In this case, the processing unit(s) 510 may be one or more microprocessors, the bus 540 may include a system bus that couples various system components including a system memory to the processing unit(s). The system bus 540 may be any of several types of bus structures including a memory bus or memory controller, a peripheral bus, and a local bus using any of a variety of bus architectures. The storage devices 520 may include system memory, such as read only memory (ROM) and/or random access memory (RAM). A basic input/output system (BIOS), containing basic routines that help to transfer information between elements within the personal computer, such as during start-up, may be stored in ROM. The storage device(s) 520 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media. The hard disk drive, magnetic disk drive, and (magneto-) optical disk drive may be coupled with the system bus 540 by a hard disk drive interface, a magnetic disk drive interface, and an (magneto-) optical drive interface, respectively. The drives and their associated storage media may provide nonvolatile storage of machine-readable instructions, data structures, program modules and other data for the personal computer. Although the exemplary environment described herein employs a hard disk, a removable magnetic disk and a removable optical disk, those skilled in the art will appreciate that other types of storage media (with appropriate interface devices), may be used instead of, or in addition to, the storage devices introduced above.

A user may enter commands and information into the personal computer through input devices 532, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 510 through a serial port interface 530 coupled to the system bus 540. Input devices may be connected by other interfaces 530, such as a parallel port, a game port or a universal serial bus (USB). However, in the context of a search facility 130, no input devices, other than those needed to accept queries, and possibly those for system administration and maintenance, are needed.

The output device(s) 534 may include a monitor or other type of display device, which may also be connected to the system bus 540 via an interface 530, such as a video adapter for example. In addition to (or instead of) the monitor, the personal computer may include other (peripheral) output devices (not shown), such as speakers and printers for example. Again, in the context of a search facility 130, no output devices, other than those needed to communicate query results, and possibly those for system administration and maintenance, are needed.

The computer may operate in a networked environment which defines logical and/or physical connections to one or more remote computers, such as a remote computer. The remote computer may be another personal computer, a server, a router, a network computer, a peer device or other common network node, and may include many or all of the elements described above relative to the personal computer. The logical and/or physical connections may include a local area network (LAN) and a wide area network (WAN). An intranet and the Internet may be used instead of, or in addition to, such networks.

When used in a LAN, the personal computer may be connected to the LAN through a network interface adapter (or "NIC") 530. When used in a WAN, such as the Internet, the personal computer may include a modem or other means for establishing communications over the wide area network. In a networked environment, at least some of the program modules depicted relative to the personal computer may be stored in the remote memory storage device. The network connections shown are exemplary and other means of establishing a communications link between the computers may be used.

Referring once again to FIG. 1, the information access facility 110 may be a personal computer, the browsing operation 112 may be an Internet browser, and the input/output interface operation(s) 118 may include communications software and hardware. Other information access facilities 110 may be untethered devices such as mobile telephones, personal digital assistants, etc., or other information appliances such as set-top boxes, network appliances, etc.

§4.2.3 Refinements, Alternatives and Extensions

Although embodiments consistent with the present invention were described as processing Web page documents, embodiments consistent with the present invention can operate on various other types of documents (e.g., snippets extracted from other documents, text documents, spreadsheets, database records, media streams, emails, email SPAM, bit sequences, genetic sequences, nucleotide sequences, representations of chemical structures, representations of molecular structures, characteristics of physical objects, etc.). Thus, embodiments consistent with the present invention have various applications. For example, embodiments consistent with the present invention might be used for spam detection, since spam is often replicated many times, perhaps with subtle differences. As another example, embodiments consistent with the present invention might be use to detect redundant snippets of news stories.

Some near-duplicate document detection algorithms perform poorly on pairs of Web pages from the same Website. The present inventor believes that this is mostly due to boilerplate text. In some alternative embodiments consistent with the present invention, boilerplate might be detected, and then removed or ignored in near-duplicate document analysis. Alternatively, or in addition, an algorithm used to analyze Web pages on the same Website to find near-duplicate documents might be different (and potentially slower) than another algorithm used to analyze pairs of Web pages on different Websites.

Referring back to block 320 of FIG. 3, some embodiments consistent with the present invention might modify the first document similarity technique such that features are weighted by frequency.

Still referring to FIG. 3, although the exemplary methods consistent with the present invention described the simple case of a first document similarity technique followed by a second document similarity technique, more than two document similarity techniques might be used. Alternatively, or in addition, at least two document similarity techniques might be used, at least one of which might be applied recursively.

In some exemplary embodiments described above, a Charikar-based technique was run after a Broder-Fetterly-based technique. This is because a Charikar-based technique can be tuned to a finer degree (e.g., 372 bits of 384 bit vectors match) than a Broder-Fetterly-based technique (e.g., 2 of 6 matching supershingles). Thus, in such embodiments, the second technique can be tuned to a finer degree than the first technique. However, in alternative embodiments consistent with the present invention, other considerations might be used in determining which technique to run first. For example, in some embodiments consistent with the present invention, the second technique might take longer to run (and/or require more storage) than the first technique.

Recall that documents may be processed to generate tokens. Some embodiments consistent with the present invention might apply special processing to URLs and/or images. For example, in some embodiments consistent with the present invention, every URL contained in the text of the page might be broken at slashes and dots, and treated like a sequence of individual terms. In some embodiments consistent with the present invention, in order to distinguish pages with different images, the URL in an IMG-tag might be considered to be a term in the page. More specifically, if the URL points to a different host, the whole URL might be considered to be a term. If, on the other hand, it points to the host of the page itself, only the filename of the URL might be used as term. Thus if a page and its images on the same host are mirrored on a different host, the URLs of the IMG-tags might generate the same tokens in the original and mirrored version. URLs can be processed using other, alternative techniques. Indeed, some embodiments consistent with the present invention might ignore URLs, or simply treat URLs as a term.

Although exemplary embodiments described above might use Rabin's fingerprinting technique to generate tokens, tokens can be generated using other fingerprinting techniques (e.g., fingerprinting techniques referenced in the Hoad and Zobel paper).

Some embodiments consistent with the present invention might increase recall by, in addition to determining a "final" set of near-duplicate documents as described above, determining a second final set of near-duplicate documents using a Charikar-based technique (preferably with a high threshold, such as 97% of b, or at least 96% of b). A union of the final set and second final set of near duplicate documents is taken to obtain a "high recall" set of near duplicate documents.

§4.3 CONCLUSIONS

As can be appreciated from the foregoing, improved near-duplicate detection techniques are disclosed. These near-duplicate detection techniques performed well, particularly when analyzing Web pages from the same Website. These techniques did so without sacrificing much in the number of returned correct pairs.

What is claimed is:

1. A computer-implemented method comprising:
crawling documents accessible on a network to identify a set of documents, each document in the set of documents comprising a set of token sequence bit strings;
processing the set of documents to determine a first set of near-duplicate documents using a first document similarity technique, wherein the first document similarity technique is token order dependent and token frequency independent;
processing the first set of near-duplicate documents to determine a second set of near-duplicate documents using a second document similarity technique, wherein the second document similarity technique is token order independent and token frequency dependent, and the second set of near-duplicate documents are determined based on a first threshold value;
processing the set of documents to identify a third set of near-duplicate documents using the second document similarity technique, and wherein the third set of near-duplicate documents are identified based on a second threshold value greater than the first threshold value; and
removing a final set of near-duplicate documents from the set of documents, and then indexing any remaining documents in the set of documents, wherein the final set of near-duplicate documents is a union of the second set of near-duplicate documents and the third set of near-duplicate documents.

2. The computer-implemented method of claim 1 wherein the first document similarity technique determines whether two documents are near-duplicates using representations based on a subset of the tokens of the documents, and
wherein the second document similarity technique determines whether two documents are near-duplicates using representations based on all of the tokens of the documents.

3. The computer-implemented method of claim 1 wherein the first document similarity technique uses set intersection to determine whether or not documents are near-duplicates, and
wherein the second document similarity technique uses random projections to determine whether or not documents are near-duplicates.

4. The computer-implemented method of claim 1 wherein the first document similarity technique includes:
fingerprinting every sub-sequence of k tokens to generate one of (A) (n−k+1) shingles, or (B) n shingles,
applying m different random permutation functions $f_i$ for $1 \leq i \leq m$ to each of the shingles to generate one of (A) n−k+1 values, or (B) n values, for each of the m random permutation functions $f_i$,
determining, for each i, the smallest value to create an m-dimensional vector of minvalues,
reducing the m-dimensional vector of minvalues to an m'-dimensional vector of supershingles by fingerprinting non-overlapping sequences of minvalues, and
concluding that two documents are near-duplicates if and only if their supershingle vectors agree in at least two supershingles.

5. The computer-implemented method of claim 1 wherein the first document similarity technique includes:
fingerprinting every sub-sequence of k tokens to generate one of (A) (n−k+1) shingles, or (B) n shingles,
fingerprinting each shingle by applying m different fingerprinting functions $f_i$ for $1 \leq i \leq m$ to each of the shingles to generate one of (A) n−k+1 values, or (B) n values, for each of the m fingerprinting functions $f_i$,
determining, for each i, the smallest value to create an m-dimensional vector of minvalues,
reducing the m-dimensional vector of minvalues to an m'-dimensional vector of supershingles by fingerprinting non-overlapping sequences of minvalues, and
concluding that two documents are near-duplicates if and only if their supershingle vectors agree in at least two supershingles.

6. The computer-implemented method of claim 5 wherein m=84, m'=6 and k is any value from 5 to 10.

7. The computer-implemented method of claim 6 wherein k=8.

8. The computer-implemented method of claim 1 wherein the second document similarity technique includes:
projecting each token into b-dimensional space by randomly choosing a predetermined number b of entries from {−1, 1},
for each document:
creating a b-dimensional vector for the document by adding the projections of all the tokens in a token sequence of the document,
creating a final vector for the document by setting every positive entry in the b-dimensional vector for the document to 1 and every non-positive entry to 0, and
determining a similarity between two documents based on a number of bits in which the corresponding final vectors of the two documents agree.

9. The computer-implemented method of claim 8 wherein b=384.

10. The computer-implemented method of claim 8 wherein b is from 100 to 384.

11. The computer-implemented method of claim 8 wherein b is set such that a bit string of 48 bytes is stored per document.

12. The computer-implemented method of claim 1 wherein the act of processing the first set of near-duplicate documents to determine a second set of near-duplicate documents using a second document similarity technique includes:
accepting the first set of near-duplicate documents,
for each pair of near-duplicate documents in the first set,
determining a similarity value using the second document similarity technique,
if the determined similarity value is less than a threshold, then removing the current pair of near-duplicate documents from the first set to generate an updated set, and
setting the second set to a most recent updated set of near-duplicate documents.

13. The computer-implemented method of claim 12 wherein the second document similarity technique includes:
projecting each token into b-dimensional space by randomly choosing a predetermined number b of entries from {−1, 1},
for each document,
creating a b-dimensional vector for the document by adding the projections of all the tokens in a token sequence of the document,
creating a final vector for the document by setting every positive entry in the b-dimensional vector for the document to 1 and every non-positive entry to 0,
determining a similarity between two documents based on a number of bits in which the corresponding final vectors of the two documents agree.

14. The computer-implemented method of claim 13 wherein the predetermined number b is 384 and wherein the threshold is set to 372.

15. The computer-implemented method of claim 13 wherein the threshold is set to approximately 97% of the predetermined number b.

16. The computer-implemented method of claim 13 wherein the threshold is set to at least 96% of the predetermined number b.

17. The computer-implemented method of claim 1 wherein each token sequence bit string was generated from a Web page.

18. The computer-implemented method of claim 1 wherein the first document similarity technique requires less processing time than the second document similarity technique.

19. The computer-implemented method of claim 1 wherein the first document similarity technique requires less storage to run than the second document similarity technique.

20. The computer-implemented method of claim 1 wherein the second document similarity technique can be tuned to a finer degree than the first document similarity technique.

21. The computer-implemented method of claim 1 further comprising removing boilerplate from the accepted set of documents to generate a set of preprocessed documents, wherein the act processing the set of documents to determine a first set of near-duplicate documents using a first document similarity technique operates on the set of preprocessed documents.

22. A non-transitory machine readable medium having stored thereon machine-executable instructions which, when executed by a machine, cause the machine to perform operations comprising:
    crawling documents accessible on a network to identify a set of documents, each document comprising a set of token sequence bit strings;
    processing the set of documents to determine a first set of near-duplicate documents using a first document similarity technique, wherein the first document similarity technique is token order dependent and token frequency independent;
    processing the first set of near-duplicate documents to determine a second set of near-duplicate documents using a second document similarity technique, wherein the second document similarity technique is token order independent and token frequency dependent, and the second set of near-duplicate documents are determined based on a first threshold value;
    processing the set of documents to identify a third set of near-duplicate documents using the second document similarity technique, and wherein the third set of near-duplicate documents are identified based on a second threshold value greater than the first threshold value; and
    removing a final set of near-duplicate documents from the set of documents, and then indexing any remaining documents in the set of documents, wherein the final set of near-duplicate documents is a union of the second set of near-duplicate documents and the third set of near-duplicate documents.

23. The non-transitory machine readable medium of claim 22 wherein the first document similarity technique determines whether two documents are near-duplicates using representations based on a subset of the tokens of the documents, and
    wherein the second document similarity technique determines whether two documents are near-duplicates using representations based on all of the tokens of the documents.

24. The non-transitory machine readable medium of claim 22 wherein the first document similarity technique uses set intersection to determine whether or not documents are near-duplicates, and
    wherein the second document similarity technique uses random projections to determine whether or not documents are near-duplicates.

25. The non-transitory machine readable medium of claim 22 wherein the first document similarity technique includes:
    fingerprinting every sub-sequence of k tokens to generate one of (A) (n−k+1) shingles, or (B) n shingles,
    applying m different random permutation functions $f_i$ for $1 \leq i \leq m$ to each of the shingles to generate one of (A) n−k+1 values, or (B) n values, for each of the m random permutation functions $f_i$,
    determining, for each i, the smallest value to create an m-dimensional vector of minvalues,
    reducing the m-dimensional vector of minvalues to an m'-dimensional vector of supershingles by fingerprinting non-overlapping sequences of minvalues, and
    concluding that two documents are near-duplicates if and only if their supershingle vectors agree in at least two supershingles.

26. The non-transitory machine readable medium of claim 22 wherein the first document similarity technique includes:
    fingerprinting every sub-sequence of k tokens to generate one of (A) (n−k+1) shingles, or (B) n shingles,
    fingerprinting each shingle by applying m different fingerprinting functions $f_i$ for $1 \leq i \leq m$ to each of the shingles to generate one of (A) n−k +1 values, or (B) n values, for each of the m fingerprinting functions $f_i$,
    determining, for each i, the smallest value to create an m-dimensional vector of minvalues,
    reducing the m-dimensional vector of minvalues to an m'-dimensional vector of supershingles by fingerprinting non-overlapping sequences of minvalues, and
    concluding that two documents are near-duplicates if and only if their supershingle vectors agree in at least two supershingles.

27. The non-transitory machine readable medium of claim 26 wherein m=84, m'=6 and k is any value from 5 to 10.

28. The non-transitory machine readable medium of claim 27 wherein k=8.

29. The non-transitory machine readable medium of claim 22 wherein the second document similarity technique includes:
    projecting each token into b-dimensional space by randomly choosing a predetermined number b of entries from $\{-1, 1\}$,
    for each document:
        creating a b-dimensional vector for the document by adding the projections of all the tokens in a token sequence of the document,
        creating a final vector for the document by setting every positive entry in the b-dimensional vector for the document to 1 and every non-positive entry to 0, and
    determining a similarity between two documents based on a number of bits in which the corresponding final vectors of the two documents agree.

30. The non-transitory machine readable medium of claim 29 wherein b=384.

31. The non-transitory machine readable medium of claim 29 wherein b is from 100 to 384.

32. The non-transitory machine readable medium of claim 29 wherein b is set such that a bit string of 48 bytes is stored per document.

33. The non-transitory machine readable medium of claim 22 wherein when the machine-executable instructions are executed by a machine, the act of processing the first set of near-duplicate documents to determine a second set of near-duplicate documents using a second document similarity technique includes:
  accepting the first set of near-duplicate documents,
  for each pair of near-duplicate documents in the first set,
    determining a similarity value using the second document similarity technique,
    if the determine similarity value is less than a threshold, then removing the current pair of near-duplicate documents from the first set to generate an updated set, and
  setting the second set to a most recent updated set of near-duplicate documents.

34. The non-transitory machine readable medium of claim 33 wherein the second document similarity technique includes:
  projecting each token into b-dimensional space by randomly choosing a predetermined number b of entries from $\{-1, 1\}$,
  for each document,
    creating a b-dimensional vector for the document by adding the projections of all the tokens in a token sequence of the document,
    creating a final vector for the document by setting every positive entry in the b-dimensional vector for the document to 1 and every non-positive entry to 0,
  determining a similarity between two documents based on a number of bits in which the corresponding final vectors of the two documents agree.

35. The non-transitory machine readable medium of claim 34 wherein the predetermined number b is 384 and wherein the threshold is set to 372.

36. The non-transitory machine readable medium of claim 34 wherein the threshold is set to approximately 97% of the predetermined number b.

37. The non-transitory machine readable medium of claim 34 wherein the threshold is set to at least 96% of the predetermined number b.

38. The non-transitory machine readable medium of claim 22 wherein each token sequence bit string was generated from a Web page.

39. The non-transitory machine readable medium of claim 22 wherein the first document similarity technique requires less processing time than the second document similarity technique.

40. The non-transitory machine readable medium of claim 22 wherein the first document similarity technique requires less storage to run than the second document similarity technique.

41. The non-transitory machine readable medium of claim 22 wherein the second document similarity technique can be tuned to a finer degree than the first document similarity technique.

42. The non-transitory machine readable medium of claim 22 wherein the operations further comprise removing boilerplate from the accepted set of documents to generate a set of preprocessed documents, wherein the act processing the set of documents to determine a first set of near-duplicate documents using a first document similarity technique operates on the set of preprocessed documents.

43. A system comprising:
  one or more computers programmed to perform operations comprising:
    crawling documents accessible on a network to identify a set of documents, each document comprising a set of token sequence bit strings;
    processing the set of documents to determine a first set of near-duplicate documents using a first document similarity technique, wherein the first document similarity technique is token order dependent and token frequency independent;
    processing the first set of near-duplicate documents to determine a second set of near-duplicate documents using a second document similarity technique, wherein the second document similarity technique is token order independent and token frequency dependent, and the second set of near-duplicate documents are determined based on a first threshold value;
    processing the set of documents to identify a third set of near-duplicate documents using the second document similarity technique, and wherein the third set of near-duplicate documents are identified based on a second threshold value greater than the first threshold value; and
    removing the final set of near-duplicate documents from the set of documents, and then indexing any remaining documents in the set of documents, wherein the final set of near-duplicate documents is a union of the second set of near-duplicate documents and the third set of near-duplicate documents.

44. The system of claim 43 wherein the first document similarity technique determines whether two documents are near-duplicates using representations based on a subset of the tokens of the documents, and
  wherein the second document similarity technique determines whether two documents are near-duplicates using representations based on all of the tokens of the documents.

45. The system of claim 43 wherein the first document similarity technique uses set intersection to determine whether or not documents are near-duplicates, and
  wherein the second document similarity technique uses random projections to determine whether or not documents are near-duplicates.

46. The system of claim 43 wherein the first document similarity technique includes:
  fingerprinting every sub-sequence of k tokens to generate one of (A) (n−k+1) shingles, or (B) n shingles,
  applying m different random permutation functions $f_i$ for $1 \leq i \leq m$ to each of the shingles to generate one of (A) n−k+1 values, or (B) n values, for each of the m random permutation functions $f_i$,
  determining, for each i, the smallest value to create an m-dimensional vector of minvalues,
  reducing the m-dimensional vector of minvalues to an m'-dimensional vector of supershingles by fingerprinting non-overlapping sequences of minvalues, and
  concluding that two documents are near-duplicates if and only if their supershingle vectors agree in at least two supershingles.

47. The system of claim 43 wherein the first document similarity technique includes:
  fingerprinting every sub-sequence of tokens to generate one of (A) (n−k+1) shingles, or (B) n shingles,
  fingerprinting each shingle by applying m different fingerprinting functions $f_i$ for $1 \leq i \leq m$ to each of the shingles to generate one of (A) n−k+1 values, or (B) n values, for each of the m fingerprinting functions $f_i$,
  determining, for each i, the smallest value to create an m-dimensional vector of minvalues, reducing the m-dimensional vector of minvalues to an m'-dimensional vector of supershingles by fingerprinting non-overlapping sequences of minvalues, and concluding that two documents are near-duplicates if and only if their supershingle vectors agree in at least two supershingles.

48. The system of claim 47 wherein m=84, m'=6 and k is any value from 5 to 10.

49. The system of claim 48 wherein k=8.

50. The system of claim 24 wherein the second document similarity technique includes:

projecting each token into b-dimensional space by randomly choosing a predetermined number b of entries from {−1, 1}, for each document:

creating a b-dimensional vector for the document by adding the projections of all the tokens in a token sequence of the document, creating a final vector for the document by setting every positive entry in the b-dimensional vector for the document to 1 and every non-positive entry to 0, and determining a similarity between two documents based on a number of bits in which the corresponding final vectors of the documents agree.

51. The system of claim 50 wherein b=384.

52. The system of claim 50 wherein b is from 100 to 384.

53. The system of claim 50 wherein b is set such that a bit string of 48 bytes is stored per document.

54. The system of claim 43 wherein processing the first set of near-duplicate documents to determine a second set of near-duplicate documents using a second document similarity technique includes:

accepting the first set of near-duplicate documents, for each pair of near-duplicate documents in the first set, determining a similarity value using the second document similarity technique, if the determined similarity value is less than a threshold, then removing the current pair of near-duplicate documents from the first set to generate an updated set, and setting the second set to a most recent updated set of near-duplicate documents.

55. The system of claim 54 wherein the second document similarity technique includes:

projecting each token into b-dimensional space by randomly choosing a predetermined number b of entries from {−1, 1}, for each document, creating a b-dimensional vector for the document by adding the projections of all the tokens in a token sequence of the document, creating a final vector for the document by setting every positive entry in the b-dimensional vector for the document to 1 and every non-positive entry to 0, determining a similarity between two documents based on a number of bits in which the corresponding final vectors of the two documents agree.

56. The system of claim 55 wherein the predetermined number b is 384 and wherein the threshold is set to 372.

57. The system of claim 55 wherein the threshold is set to approximately 97% of the predetermined number b.

58. The system of claim 55 wherein the threshold is set to at least 96% of the predetermined number b.

59. The system of claim 43 wherein each token sequence bit string was generated from a Web page.

60. The system of claim 43 wherein the first document similarity technique requires less processing time than the second document similarity technique.

61. The system of claim 43 wherein the first document similarity technique requires less storage to run than the second document similarity technique.

62. The system of claim 43 wherein the second document similarity technique can be tuned to a finer degree than the first document similarity technique.

63. The system of claim 43 further programmed to perform operations comprising removing boilerplate from the accepted set of documents to generate a set of preprocessed documents, wherein the act processing the set of documents to determine a first set of near-duplicate documents using a first document similarity technique operates on the set of preprocessed documents.

* * * * *

UNITED STATES PATENT AND TRADEMARK OFFICE
CERTIFICATE OF CORRECTION

| | | |
|---|---|---|
| PATENT NO. | : 8,015,162 B2 | Page 1 of 1 |
| APPLICATION NO. | : 11/499260 | |
| DATED | : September 6, 2011 | |
| INVENTOR(S) | : Monika H. Henzinger | |

It is certified that error appears in the above-identified patent and that said Letters Patent is hereby corrected as shown below:

Column 19, line 4, in Claim 33, delete "determine" and insert therefore --determined--;

Column 20, line 60, in Claim 47, delete "of tokens" and insert therefore --of k tokens--;

Column 21, line 10, in Claim 50, delete "claim 24" and insert therefore --claim 43--; and Column 21, line 24, in Claim 50, after "the", please insert --two--.

Signed and Sealed this
Thirty-first Day of January, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,015,162 B2 | Page 1 of 1 |
| APPLICATION NO. | : 11/499260 | |
| DATED | : September 6, 2011 | |
| INVENTOR(S) | : Henzinger | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 199 days.

Signed and Sealed this
Third Day of April, 2012

David J. Kappos
*Director of the United States Patent and Trademark Office*